United States Patent
Barsness et al.

(10) Patent No.: US 7,937,728 B2
(45) Date of Patent: May 3, 2011

(54) RETRIEVING LOST CONTENT FOR A SCHEDULED PROGRAM

(75) Inventors: Eric Lawrence Barsness, Pine Island, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 472 days.

(21) Appl. No.: 11/567,516

(22) Filed: Dec. 6, 2006

(65) Prior Publication Data

US 2008/0141309 A1  Jun. 12, 2008

(51) Int. Cl.
*G06F 3/00* (2006.01)

(52) U.S. Cl. ............... 725/58; 725/93; 386/46; 386/92

(58) Field of Classification Search .................. None
See application file for complete search history.

(56) References Cited

U.S. PATENT DOCUMENTS

| | | | | |
|---|---|---|---|---|
| 6,961,538 | B2 * | 11/2005 | Arsenault et al. | 455/3.02 |
| 7,194,249 | B2 | 3/2007 | Phillips et al. | |
| 7,451,346 | B2 * | 11/2008 | Katsuragi et al. | 714/6 |
| 2005/0083929 | A1 * | 4/2005 | Salo et al. | 370/389 |
| 2006/0117371 | A1 * | 6/2006 | Margulis | 725/131 |
| 2006/0224763 | A1 * | 10/2006 | Altunbasak et al. | 709/231 |
| 2007/0009235 | A1 * | 1/2007 | Walters et al. | 386/112 |
| 2007/0266414 | A1 * | 11/2007 | Kahn et al. | 725/113 |

* cited by examiner

*Primary Examiner* — Andrew Y Koenig
*Assistant Examiner* — Rong Le
(74) *Attorney, Agent, or Firm* — Owen J. Gamon

(57) ABSTRACT

In an embodiment, content is received on a channel between a scheduled start time and a scheduled stop time. A schedule specifies a planned transmission of a scheduled program between the scheduled start time and the scheduled stop time. The received content is recorded to a saved program. A determination is made that the saved program includes interruption content that is different from lost content of the scheduled program. A request for the lost content is sent to a content provider, the lost content is received from the content provider, and the interruption content is replaced in the saved program with the lost content. The request includes a begin time of the lost content relative to a beginning of the scheduled program and an amount of the lost content.

8 Claims, 10 Drawing Sheets

INTERRUPTION KEYWORDS _172_

WEATHER BULLETIN

TORNADO WATCH

TORNADO WARNING

REPORTER NAME A

REPORTER NAME B

SPECIAL REPORT

FIG. 7A

| DOWNLOAD LOST CONTENT REQUEST _175_ ||||||
|---|---|---|---|---|
| SUBSCRIBER ID _750_ | PROGRAM ID _755_ | BEGIN TIME WITHIN PROGRAM OF LOST CONTENT _760_ | AMOUNT OF LOST CONTENT _765_ | FEE AUTHORIZATION _770_ |
|  |  |  |  |  |

FIG. 7B

RETRIEVING LOST CONTENT FOR A SCHEDULED PROGRAM

CROSS-REFERENCE TO RELATED APPLICATION

The present application is related to commonly-assigned patent application Ser. No. 11/558,196 to Eric L. Barsness, et al., filed Nov. 9, 2006, entitled "Detecting Interruptions in Scheduled Programs," which is herein incorporated by reference.

FIELD

An embodiment of the invention generally relates to digital video recorders. In particular, an embodiment of the invention generally relates to retrieving lost content for scheduled programs that are recorded on digital video recorders.

BACKGROUND

Through the device called a television set or TV, viewers are able to receive, view, and hear programs, such as news, sports, entertainment, information, and commercials. The development and popularization of the VCR (video cassette recorder) dramatically changed the way viewers use television because, for the first time, the VCR gave the viewers control of the time at which they could watch content on their TV sets. The VCR spawned the video rental and sales market, and today, VCRs are commonplace.

Now, a new innovation makes recording television programs even more convenient: the digital video recorder, or DVR. Although the digital video recorder performs much the same functions as a VCR, there are some important differences. First, a digital video recorder is tape-less and has no removable media. With a VCR, the device itself is merely a recording tool; the blank cassette is the removable media. In a digital video recorder, the media and tool are one and the same, which is advantageous because buying and cataloging tapes are unnecessary. Second, because the digital video recorder typically stores the audio and video content in digital form on a hard drive, which is a random access device, the digital video recorder can access or skip between a variety of locations within the content without needing to start at the beginning and perform a sequential search. Because of the popularity and convenience of the DVR, viewers are increasingly watching prerecorded programs instead of watching while the programs are received from the content provider, such as a broadcast television station, cable TV service, or satellite service.

One problem that viewers experience when watching prerecorded programs is programs that have been interrupted, so that the full content of the program is not recorded on the digital video recorder. Interruptions can happen for a number of reasons, but the primary reasons are the incoming transmission signal can be lost or degraded; the scheduled program can be interrupted by some other content, such as a special report or a severe weather warning; or the program might fail to start at the scheduled time because a preceding program (e.g., a sporting event whose length is not predetermined) ran long. Reasons for signal loss can include technical problems at the program provider, technical problems at the viewer's location, or transmission problems due to weather or damage. These interruptions disrupt the continuity of the recorded program and may delete climatic scenes and important information, which causes viewer disappointment.

Thus, what is needed is a better way to handle programs that have been interrupted.

SUMMARY

A method, apparatus, system, and storage medium are provided. In an embodiment, content is received on a channel between a scheduled start time and a scheduled stop time. A schedule specifies a planned transmission of a scheduled program between the scheduled start time and the scheduled stop time. The received content is recorded as a saved program. A determination is made that the saved program includes interruption content that is different from lost content of the scheduled program. A request for the lost content is sent to a content provider, the lost content is received from the content provider, and the interruption content is replaced in the saved program with the lost content. The request includes a begin time of the lost content relative to a beginning of the scheduled program and an amount of the lost content. In this way, the interruption in the saved program is removed and the content of the saved program becomes the same as the scheduled program.

BRIEF DESCRIPTION OF THE DRAWING

FIG. 7A depicts a block diagram of example interruption keywords, according to an embodiment of the invention.

FIG. 7B depicts a block diagram of an example download lost content request, according to an embodiment of the invention.

DETAILED DESCRIPTION

Figure 1:
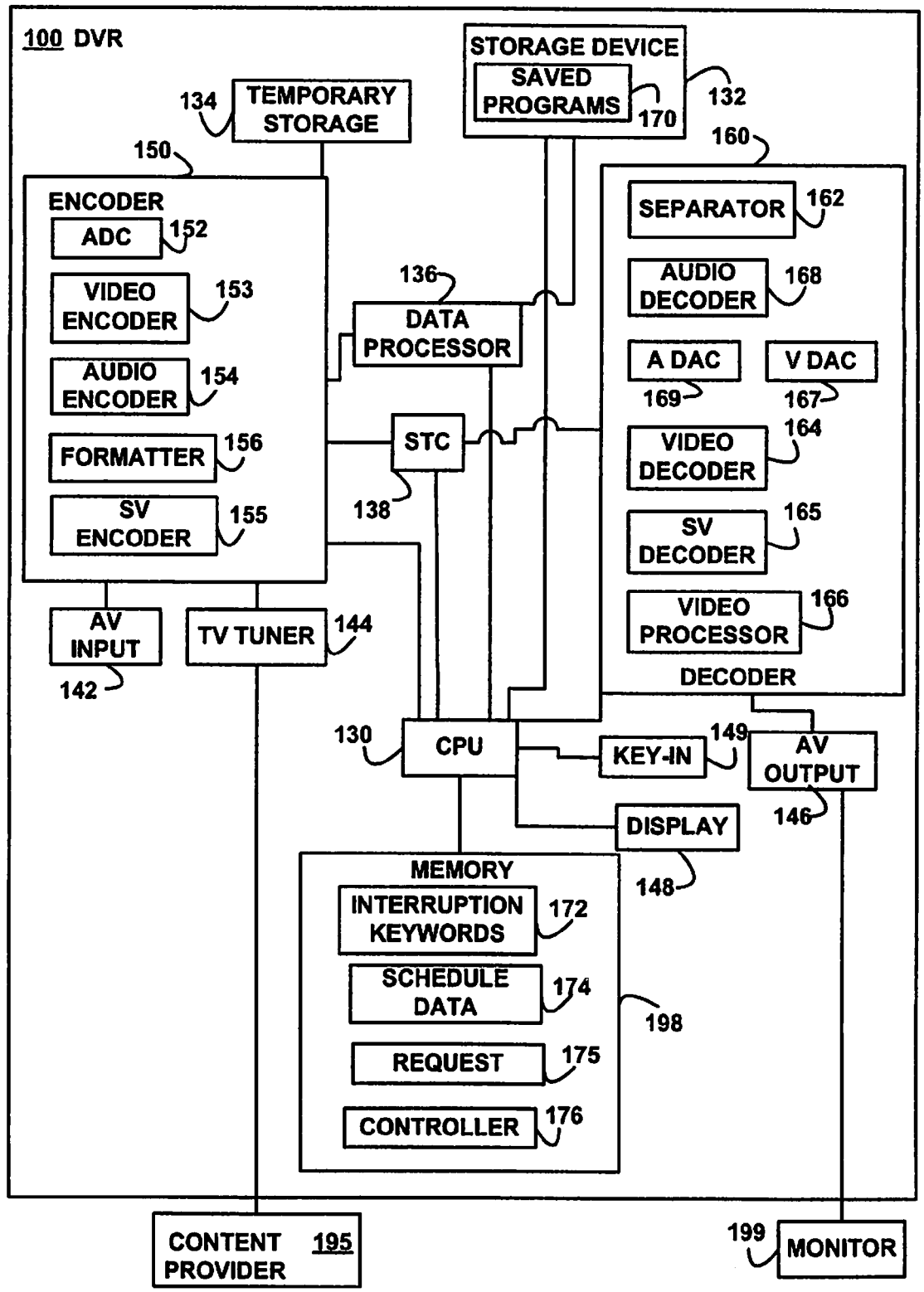
FIG. 1 depicts a block diagram of an example digital video recorder for implementing an embodiment of the invention.

Referring to the Drawings, wherein like numbers denote like parts throughout the several views, FIG. 1 depicts a block diagram of an example digital video recorder (DVR) 100 used for recording/playing back digital moving image and/or audio information, according to an embodiment of the invention. The digital video recorder 100 includes a CPU (central processing unit) 130, a storage device 132, temporary storage 134, a data processor 136, a system time counter 138, an audio/video input 142, a TV tuner 144, an audio/video output 146, a display 148, a key-in 149, an encoder 150, a decoder 160, and memory 198. The CPU 130 may be implemented via a programmable general purpose central processing unit that controls operation of the digital video recorder 100.

The storage device 132 may be implemented by a direct access storage device (DASD), a DVD-RAM, a CD-RW, or any other type of storage device capable of encoding, reading, and writing data. The storage device 132 stores the saved programs 170. The saved programs 170 are data that are capable of being stored, retrieved, and presented or played. In various embodiments, the saved programs 170 may be television programs, radio programs, movies, video, audio, still images, graphics, or any combination thereof.

The encoder 150 includes an analog-digital converter 152, a video encoder 153, an audio encoder 154, a sub-video encoder 155, and a formatter 156. The analog-digital converter 152 is supplied with an external analog video signal and an external analog audio signal from the audio-video input 142 or an analog TV signal and an analog voice or audio signal from the TV tuner 144. The analog-digital converter 152 converts an input analog video signal into a digital form. For example, the analog-digital converter 152 converts into digital form a luminance component and color difference components. Further, the analog-digital converter 152 converts an input analog audio signal into a digital form.

When an analog video signal and digital audio signal are input to the analog-digital converter 152, the analog-digital converter 152 passes the digital audio signal there through as it is. At this time, a process for reducing the jitter attached to the digital signal or a process for changing the sampling rate or quantization bit number may be effected without changing the contents of the digital audio signal. Further, when a digital video signal and digital audio signal are input to the analog-digital converter 152, the analog-digital converter 152 passes the digital video signal and digital audio signal there through as they are. The jitter reducing process or sampling rate changing process may be effected without changing the contents of the digital signals.

The digital video signal component from the analog-digital converter 152 is supplied to the formatter 156 via the video encoder 153. The digital audio signal component from the analog-digital converter 152 is supplied to the formatter 156 via the audio encoder 154.

The video encoder 153 converts the input digital video signal into a compressed digital signal at a variable bit rate. For example, the video encoder 153 may implement the MPEG2 (Moving Picture Experts Group 2) or MPEG1 specification, but in other embodiments any appropriate specification may be used.

The audio encoder 154 converts the input digital audio signal into a digital signal (or digital signal of linear PCM (Pulse Code Modulation)) compressed at a fixed bit rate based, e.g., on the MPEG audio or AC-3 specification, but in other embodiments any appropriate specification may be used.

When a video signal is input from the audio-video input 142 or when the video signal is received from the TV tuner 144, the sub-video signal component in the video signal is input to the sub-video encoder 155. The sub-video data input to the sub-video encoder 155 is converted into a preset signal configuration and then supplied to the formatter 156. The formatter 156 performs preset signal processing for the input video signal, audio signal, sub-video signal and outputs record data to the data processor 136.

The temporary storage 134 buffers a preset amount of data among data (data output from the encoder 150) written into the storage device 132 or buffers a preset amount of data among data (data input to the decoder 160) played back from the storage device 132. The data processor 136 supplies record data from the encoder 150 to the storage device 132, extracts a playback signal played back from the storage device 132, rewrites management information recorded on the storage device 132, or deletes data recorded on the storage device 132 according to the control of the CPU 130.

The contents to be notified to the user of the digital video recorder 100 are displayed on the display 148 or are displayed on a TV or monitor 199 attached to the audio-video output 146.

The timings at which the CPU 130 controls the storage device 132, data processor 136, encoder 150, and/or decoder 160 are set based on time data from the system time counter 138. The recording/playback operation is normally effected in synchronism with the time clock from the system time counter 138, and other processes may be effected at a timing independent from the system time counter 138.

The decoder 160 includes a separator 162 for separating and extracting each pack from the playback data, a video decoder 164 for decoding main video data separated by the separator 162, a sub-video decoder 165 for decoding sub-video data separated by the separator 162, an audio decoder 168 for decoding audio data separated by the separator 162, and a video processor 166 for combining the sub-video data from the sub-video decoder 165 with the video data from the video decoder 164.

The video digital-analog converter 167 converts a digital video output from the video processor 166 to an analog video signal. The audio digital-analog converter 169 converts a digital audio output from the audio decoder 168 to an analog audio signal. The analog video signal from the video digital-analog converter 167 and the analog audio signal from the audio digital-analog converter 169 are supplied to external components, which are typically a television set, monitor, or projector, via the audio-video output 146.

At the time of data processing for recording, if the user first effects the key-in operation via the key-in 149, the CPU 130 receives a recording instruction for a program and reads out management data from the storage device 132 to determine an area in which video data is recorded. In another embodiment, the CPU 130 determines the program to be recorded. Then, the CPU 130 sets the determined area in a management area and sets the recording start address of video data on the storage device 132. In this case, the management area specifies the file management section for managing the files, and control information and parameters necessary for the file management section are sequentially recorded. Next, the CPU 130 resets the time of the system time counter 138. In this example, the system time counter 138 is a timer of the system and the recording/playback operation is effected with the time thereof used as a reference.

An audio-video signal input from the audio-video input 142 or the TV tuner 144 is A/D converted by the analog-digital converter 152, and the video signal and audio signal are respectively supplied to the video encoder 153 and audio encoder 154, and the closed caption signal from the TV tuner 144 or the text signal of text broadcasting is supplied to the sub-video encoder 155.

The encoders 153, 154, 155 compress the respective input signals to make packets, and the packets are input to the formatter 156. In this case, the encoders 153, 154, 155 determine and record PTS (presentation time stamp), DTS (decode time stamp) of each packet according to the value of the system time counter 138. The formatter 156 sets each input packet data into packs, mixes the packs, and supplies the result of mixing to the data processor 136. The data processor 136 sends the pack data to the storage device 132, which stores it as one of the saved programs 170.

At the time of playback operation, the user first effects a key-in operation via the key-in 149, and the CPU 130 receives a playback instruction there from. Next, the CPU 130 supplies a read instruction and address of the program 170 to be played back to the storage device 132. The storage device 132 reads out sector data according to the supplied instruction and outputs the data in a pack data form to the decoder 160.

In the decoder 160, the separator 162 receives the readout pack data, forms the data into a packet form, transfers the video packet data (e.g., MPEG video data) to the video decoder 164, transfers the audio packet data to the audio decoder 168, and transfers the sub-video packet data to the sub-video decoder 165. Then, the decoders 164, 165, 168 effect the playback processes in synchronism with the values of the PTS of the respective packet data items and supply a moving picture with voice caption to the TV, monitor, or projector 199 via the audio-video output 146.

The memory 198 is connected to the CPU 130 and is a random access semiconductor memory. The memory 198 stores the interruption keywords 172, the schedule data 174, the request 175, and the controller 176. The interruption keywords 172 include information that the controller 176 uses to detect interruptions in programs. The schedule data 174 represents future scheduled programs that the controller 176 is to record at the scheduled time into the saved programs 170. The request 175 is built by the controller 176 and sent to the content provider 195 and requests that the content provider 195 sent content that has been lost to the digital video recorder 100.

The controller 176 includes instructions capable of executing on the CPU 130 or statements capable of being interpreted by instructions executing on the CPU 130 to control the elements of the rest of the DVR 100 and to perform the functions as further described below with reference to FIGS. 8, 9, 10, and 11. In another embodiment, the controller 176 may be implemented in microcode. In another embodiment, the controller 176 may be implemented in hardware via logic gates and/or other appropriate hardware techniques in lieu of, or in addition to, a processor-based digital video recorder.

In other embodiments, the digital video recorder 100 may be implemented as a personal computer, mainframe computer, portable computer, laptop or notebook computer, PDA (Personal Digital Assistant), tablet computer, pocket computer, television, set-top box, cable decoder box, telephone, pager, automobile, teleconferencing system, camcorder, radio, audio recorder, audio player, stereo system, MP3 (MPEG Audio Layer 3) player, digital camera, appliance, or any other appropriate type of electronic device.

The content provider 195 transmits programs to the DVR 100, which the DVR 100 receives via the TV tuner 144. In another embodiment, the DVR 100 may receive the programs via the AV input 142.

Figure 2:
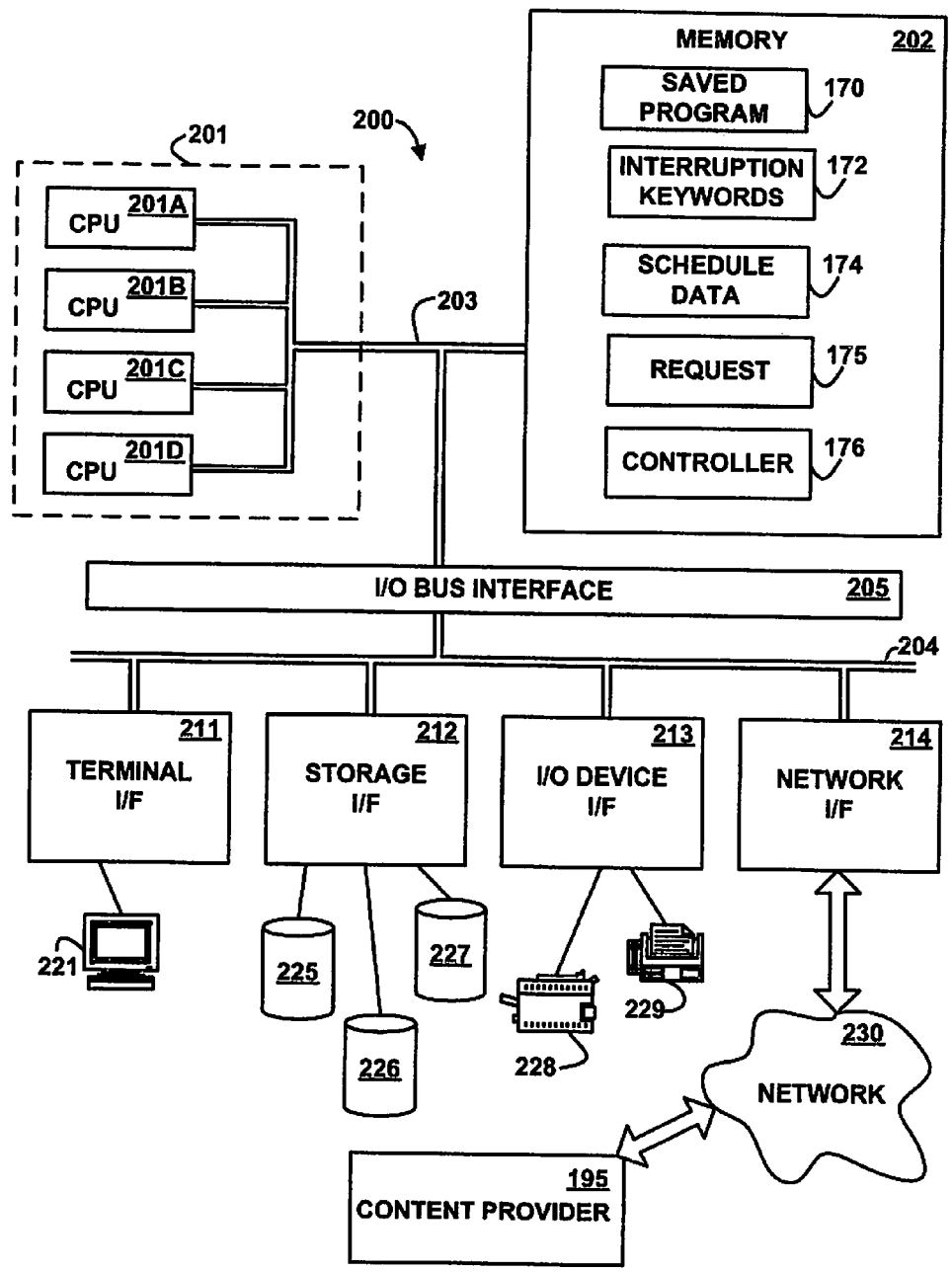
FIG. 2 depicts a block diagram of an example computer system for implementing an embodiment of the invention.

FIG. 2 depicts a high-level block diagram representation of a computer system 200 connected to a content provider 195 via a network 230, according to an embodiment of the present invention. The major components of the computer system 200 include one or more processors 201, a main memory 202, a terminal interface 211, a storage interface 212, an I/O (Input/Output) device interface 213, and communications/network interfaces 214, all of which are coupled for inter-component communication via a memory bus 203, an I/O bus 204, and an I/O bus interface unit 205.

The computer system 200 contains one or more general-purpose programmable central processing units (CPUs) 201A, 201B, 201C, and 201D, herein generically referred to as the processor 201. In an embodiment, the computer system 200 contains multiple processors typical of a relatively large system; however, in another embodiment the computer system 200 may alternatively be a single CPU system. Each processor 201 executes instructions stored in the main memory 202 and may include one or more levels of on-board cache.

The main memory 202 is a random-access semiconductor memory for storing data and computer programs. The main memory 202 is conceptually a single monolithic entity, but in other embodiments the main memory 202 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may further be distributed and associated with different CPUs or sets of CPUs, as is known in any of various so-called non-uniform memory access (NUMA) computer architectures.

The memory 202 stores or encodes a saved program 170, interruption keywords 172, schedule data 174, a request 175, and a controller 176. Although the saved program 170, the interruption keywords 172, the schedule data 174, the request 175, and the controller 176 are illustrated as being contained within the memory 202 in the computer system 200, in other embodiments some or all may be on different computer systems and may be accessed remotely, e.g., via the network 230. The computer system 200 may use virtual addressing mechanisms that allow the software of the computer system 200 to behave as if it only has access to a large, single storage entity instead of access to multiple, smaller storage entities. Thus, while the saved program 170, the interruption keywords 172, the schedule data 174, the request 175, and the controller 176 are illustrated as residing in the memory 202, these elements are not necessarily all completely contained in the same storage device at the same time.

In an embodiment, the controller 176 includes instructions capable of executing on the processors 201 or statements capable of being interpreted by instructions executing on the processors 201 to perform the processing as further described below with reference to FIGS. 8, 9, 10, and 11. In another embodiment, the controller 176 may be implemented in microcode. In another embodiment, the controller 176 may be implemented in hardware via logic gates and/or other appropriate hardware techniques in lieu of, or in addition to, a processor-based system.

The memory bus 203 provides a data communication path for transferring data among the processors 201, the main memory 202, and the I/O bus interface unit 205. The I/O bus interface unit 205 is further coupled to the system I/O bus 204 for transferring data to and from the various I/O units. The I/O bus interface unit 205 communicates with multiple I/O interface units 211, 212, 213, and 214, which are also known as I/O processors (IOPs) or I/O adapters (IOAs), through the system I/O bus 204. The system I/O bus 204 may be, e.g., an industry standard PCI (Peripheral Component Interconnect) bus, or any other appropriate bus technology. The I/O interface units support communication with a variety of storage and I/O devices. For example, the terminal interface unit 211 supports the attachment of one or more user terminals 221. The terminals 221 may include a video display screen, keyboard, speakers, pointing devices (such as a mouse, trackball, track pad, or pointing stick), or any other appropriate user input and/or user output device.

Although the memory bus 203 is shown in FIG. 2 as a relatively simple, single bus structure providing a direct communication path among the processors 201, the main memory 202, and the I/O bus interface 205, in another embodiment the memory bus 203 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 205 and the I/O bus 204 are shown as single respective units, in other embodiments the computer system 200 may contain multiple I/O bus interface units 205 and/or multiple I/O buses 204. While multiple I/O interface units are shown, which separate the system I/O bus 204 from various communications paths running to the various I/O devices, in other embodiments some or all of the I/O devices are connected directly to one or more system I/O buses.

The storage interface unit 212 supports the attachment of one or more direct access storage devices (DASD) 225, 226, and 227, which are typically rotating magnetic disk drive storage devices, although they could alternatively be other devices, including arrays of disk drives configured to appear as a single large storage device to a host. The I/O device interface 213 provides an interface to any of various other input/output devices or devices of other types. Two such devices, the printer 228 and the fax machine 229, are shown in the exemplary embodiment of FIG. 2, but in other embodiment many other such devices may exist, which may be of differing types. The network interface 214 provides one or more communications paths from the computer system 200 to other digital electronic devices and computer systems; such paths may include, e.g., one or more networks 230.

The network 230 may be any suitable network or combination of networks and may support any appropriate protocol suitable for communication of data, programs, and/or code to/from the computer system 200 and/or the content provider 195. In an embodiment, the network 230 may represent a television network, whether cable, satellite, or broadcast TV, either analog or digital. In an embodiment, the network 230 may represent a storage device or a combination of storage devices, either connected directly or indirectly to the computer system 200. In an embodiment, the network 230 may support the Infiniband architecture. In another embodiment, the network 230 may support wireless communications. In another embodiment, the network 230 may support hard-wired communications, such as a telephone line or cable. In another embodiment, the network 230 may support the Ethernet IEEE (Institute of Electrical and Electronics Engineers) 802.3x specification. In another embodiment, the network 230 may be the Internet and may support IP (Internet Protocol). In another embodiment, the network 230 may be a local area network (LAN) or a wide area network (WAN). In another embodiment, the network 230 may be a hotspot service provider network. In another embodiment, the network 230 may be an intranet. In another embodiment, the network 230 may be a GPRS (General Packet Radio Service) network. In another embodiment, the network 230 may be a FRS (Family Radio Service) network. In another embodiment, the network 230 may be any appropriate cellular data network or cell-based radio network technology. In another embodiment, the network 230 may be an IEEE 802.11B wireless network. In still another embodiment, the network 230 may be any suitable network or combination of networks. Although one network 230 is shown, in other embodiments any number of networks (of the same or different types) may be present.

In various embodiments, the computer system 200 may be a multi-user "mainframe" computer system, a single-user system, or a server or similar device that has little or no direct user interface, but receives requests from other computer systems (clients). In other embodiments, the computer system 200 may be implemented as a personal computer, portable computer, laptop or notebook computer, PDA (Personal Digital Assistant), tablet computer, pocket computer, telephone, pager, automobile, teleconferencing system, video recorder, camcorder, audio recorder, audio player, stereo system, MP3 (MPEG Audio Layer 3) player, digital camera, appliance, or any other appropriate type of electronic device.

The content provider 195 transmits programs, which the computer system 200 may receive. In various embodiments, the content provider 195 may be a television station, a cable television system, a satellite television system, an Internet television provider, or any other appropriate content provider.

It should be understood that FIGS. 1 and 2 are intended to depict the representative major components of the DVR 100, the computer system 200, the content provider 195, and the network 230 at a high level, that individual components may have greater complexity than that represented in FIGS. 1 and 2, that components other than, instead of, or in addition to those shown in FIGS. 1 and 2 may be present, and that the number, type, and configuration of such components may vary. Several particular examples of such additional complexity or additional variations are disclosed herein; it being understood that these are by way of example only and are not necessarily the only such variations.

The various software components illustrated in FIGS. 1 and 2 and implementing various embodiments of the invention may be implemented in a number of manners, including using various computer software applications, routines, components, programs, objects, modules, data structures, etc., referred to hereinafter as "computer programs." The computer programs typically comprise one or more instructions that are resident at various times in various memory and storage devices in the DVR 100 and the computer system 200, and that, when read and executed by one or more processors 130 or 136 in the DVR 100 and/or the processor 201 in the computer system 200, cause the DVR 100 and/or the computer system 200 to perform the steps necessary to execute steps or elements embodying the various aspects of an embodiment of the invention.

Moreover, while embodiments of the invention have and hereinafter will be described in the context of fully functioning computer systems and digital video recorders, the various embodiments of the invention are capable of being distributed as a program product in a variety of forms, and the invention applies equally regardless of the particular type of signal-bearing medium used to actually carry out the distribution. The programs defining the functions of this embodiment may be delivered to the digital video recorder 100 and/or the computer system 200 via a variety of tangible signal-bearing computer-recordable and readable media, which include, but are not limited to:

(1) information permanently stored on a non-rewriteable storage medium, e.g., a read-only memory device attached to or within a computer system, such as CD-ROM, DVD-R, or DVD+R;

(2) alterable information stored on a rewriteable storage medium, e.g., a hard disk drive (e.g., DASD 225, 226, or 227, the storage device 132, or the memory 198), a CD-RW, CD-RW, DVD-RW, DVD+RW, DVD-RAM, or diskette;

(3) information conveyed to the digital video recorder 100 or the computer system 200 by a communications medium, such as through a computer or a telephone network, e.g., the network 230, including wireless communications.

Such tangible signal-bearing computer-recordable media, when carrying machine-readable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIGS. 1 and 2 are not intended to limit the present invention. Indeed, other alternative hardware and/or software environments may be used without departing from the scope of the invention.

Figures 3, 4:
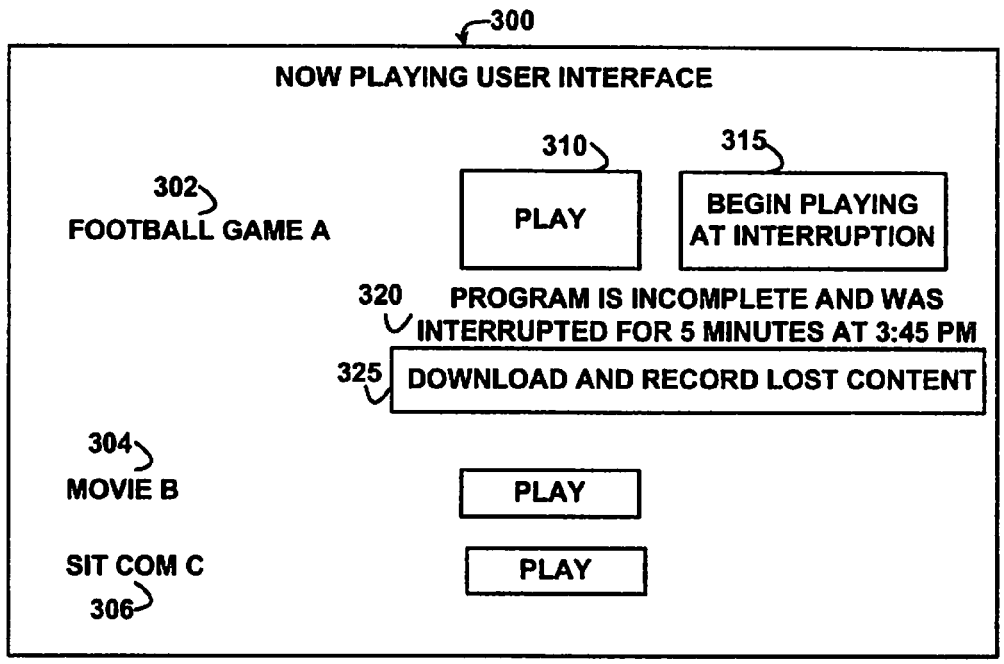
FIG. 3 depicts a block diagram of an example user interface, according to an embodiment of the invention.
FIG. 4 depicts a block diagram of example schedule data, according to an embodiment of the invention.

FIG. 3 depicts a block diagram of an example user interface 300, according to an embodiment of the invention. The controller 176 presents the user interface 300 via the display 148, the monitor 199, or a video display screen or speakers of the terminal 221.

The user interface 300 includes titles 302, 304, and 306 of saved programs 170 that are available for play or presentation. The user interface 300 also includes a playback button 310, a playback option 315 that, if selected, requests playback starting at an interruption, a message 320, and a download button 325 that, if selected requests downloading and recording lost content. The titles 302, 304, and 306 may be any identifier of the saved program 170, and may include a description, an abstract, a performer, an artist, a subject, or any other identifying information. The playback button 310, the playback option button 315, and the download button 325 may be any appropriate user interface element, whether implemented via a widget on a display screen, or selected via a pointing device, a keyboard, the key-in 149, or a voice command option. The message 320 indicates that the saved program 170 identified by the title 302 includes an interruption, meaning that the saved program 170 lacks a portion of the scheduled program content. The message 320 further identifies the location (in terms of time) and duration (in terms of time) of the interruption that occurred within the saved program 170. In another embodiment, the message 320 may include additional information, such as the cause of the interruption. The button 325 allows the user to request that the portion of the scheduled program content that is missing (the lost content) be downloaded and recorded or saved to the saved program. The button 325 may also allow the user to authorize paying a fee or charge for the downloading and recording of the lost content.

In response to selection via the user interface 300 of the playback button 310, the controller 176 begins playing, presenting, or displaying the video and/or audio contents of the saved program 170 on the monitor 199 or the terminal 221 at the beginning of the saved program 170. In response to selection via the user interface 300 of the playback option button 315, the controller 176 begins playing, presenting, or displaying the video and/or audio contents of the saved program 170 at the location within the saved program 170 of the interruption. In another embodiment, the controller 176 may begin playing the contents of the saved program 170 at a location that is a specified play time period (the amount of time needed to play the content from the location to the interruption) before the interruption occurs, so that the user can understand the context of the interruption. In an embodiment, the controller 176 has a default time period. In another embodiment, the user may select the specified time period. In response to selection via the user interface 300 of the download button 325, the controller 176 determines the content that is missing from the saved program 170 identified by the title 302, builds the download request 175, sends the download request 175 to the content provider 195. In response to receiving the download request 175, the content provider 195 finds the lost content identified by the request 175 in the scheduled program and sends the lost content to the controller 176. The controller 176 receives the lost content and saves the lost content to the saved program 170 identified by the title 302.

The example titles 304 and 306 do not have a button to initiate a command for beginning play at an interruption because their corresponding saved programs 170 were recorded without interruption.

FIG. 4 depicts a block diagram of example schedule data 174, according to an embodiment of the invention. The schedule data 174 represents scheduled programs that the content provider 195 is scheduled or planned to transmit. The schedule data 174 also represents a command to the controller 176 to record the content that is received from the content provider 195 at the scheduled times and on the scheduled channels. In various embodiments, a user may input data into the schedule data 174 via the key-in 194 or the terminal 221. The user may obtain information regarding the programs and their schedule times and channels from a schedule database of the content provider 195, either directly or indirectly via a third-party publisher. In another embodiment, the controller 176 creates data in the schedule data 174 in response to preferences entered by the user, or in response to detection of previous programs that were recorded or that were watched by the user. The controller 176 may also retrieve data from a schedule database of the content provider 195.

The schedule data 174 includes records 405, 410, and 415, each of which represents a scheduled program and a command to the controller 176 to record the received content, as specified by the record. Each of the records 405, 410, and 415 includes a scheduled start time field 420, a scheduled stop time field 425, a channel field 430, and a program identifier field 435. The scheduled start time 420 represents the date and/or time that the transmission of the content of the program 435 is expected to start being received by the controller 176 from the content provider 195. The scheduled stop time 425 represents the date and/or time that the transmission of the content of the program 435 is expected to stop being received by the controller 176. The channel identifies a channel, band, frequency, or selection mechanism that differentiates between content providers 195 or that selects between multiple programs that the controller 176 is capable of receiving at any one time, whether from the same content provider or from different content providers.

Figure 5:
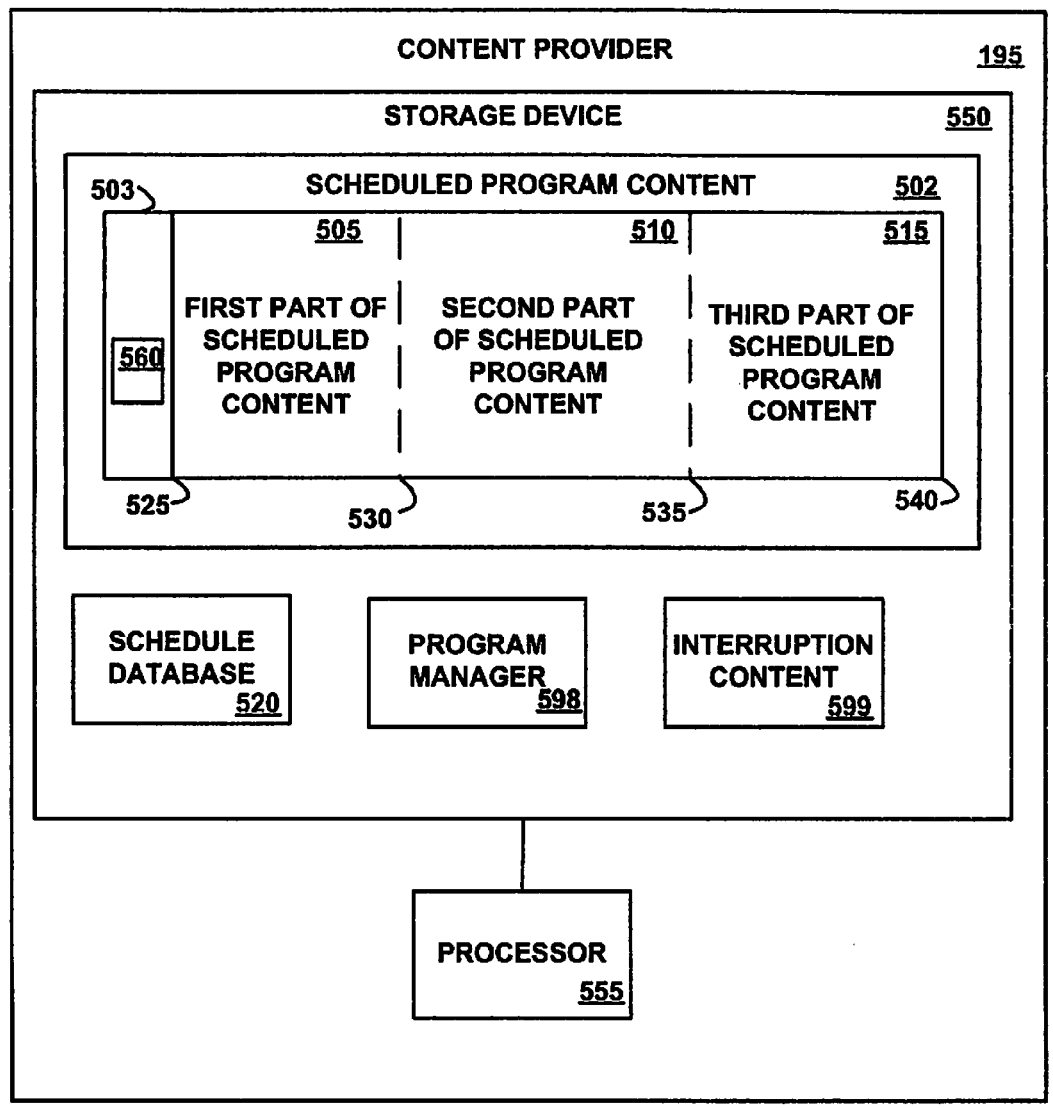
FIG. 5 depicts a block diagram of an example content provider, according to an embodiment of the invention.

FIG. 5 depicts a block diagram of an example content provider 195, according to an embodiment of the invention. In various embodiments, the content provider 195 may be a television station, a cable television system, a satellite television system, an Internet television provider, or any other appropriate provider of program content. The content provider 195 includes scheduled program content 502, a schedule database 520, a program manager 598, and optional interruption content 599, all of which are stored in storage devices 550, such as semiconductor memory, hard disks, or DVDs. The storage devices 550 are connected to a processor 555.

The scheduled program content 502 are programs that the content provider 195 is scheduled or planned to transmit at the time(s) and on the channel(s), as specified in advance of the time of transmission by the schedule database 520. Examples of scheduled program content 502 include movies, television programs, educational programs, audio, video, advertisements, text, images, or any portion, combination, or multiple thereof. The scheduled program content 502 is identified by the program identifier 435 and has a scheduled start time 420, a scheduled stop time 425, and a scheduled channel 430 on which the scheduled program content 502 is scheduled to be transmitted by the content provider 195 and scheduled to be received and saved by the DVR 100 and/or the computer system 200.

The scheduled program content 502 includes an optional header 503, a first part 505, a second part 510, and a third part 515. The optional header 503 may include an identifier of the scheduled program content 502, a length 560 (specified in units of the time needed to play the scheduled program content 502) or amount of data in the scheduled program content 502, format information for the scheduled program content 502, or any other appropriate control or protocol information. The first part 505 represents the first part in time order of play or transmission, the second part 510 represents the second part in time order of play or transmission, and the third part 515 represents the third part in time order of play or transmission. The first part 505 is delineated by the points 525 and 530. The second part 510 is delineated by the points 530 and 535. The third part 515 is delineated by the points 535 and 540. The point 525 represents the scheduled start location and time of the first part 505. The point 530 represents the scheduled stop location and time of the first part 505 and the scheduled start location and time of the second part 510. The point 535 represents the scheduled stop location and time of the second part 510 and the scheduled start location and time of the third part 515. The point 540 represents the scheduled end location and time of the third part 515 and of the entire scheduled program content 502. The parts 505, 510, and 515 and the points 525, 530, 535, and 540 are used for convenience of exposition only, and the parts and points are not necessarily identified or stored in this way at the content provider 195.

The optional interruption content 599 represents video, audio, text, images, or any portion, combination, or multiple thereof that the content provider 195 transmits instead of all, or a portion, of the scheduled program content 502. The interruption content 599 was not identified in the schedule database 520 prior to being transmitted by the content provider 195. Examples of the interruption content 599 include special reports, emergency broadcasts, severe weather warnings or watches, or "test patterns" that are broadcast while the content provider 195 is experiencing technical difficulties. If an interruption does not occur at the content provider 195, then the interruption content 599 does not exist or is not transmitted.

If no interruption occurs at the content provider 195, then the content provider 195 transmits all of the scheduled program content 502 on the channel 430 between the scheduled start time 420 and the scheduled stop time 425 via signal transmissions, as specified by the schedule of the content provider 195 in the schedule database 520. The DVR 100 and/or the computer system 200 may receive some or all of the signal transmissions and save or record some or all of the received content of the scheduled program content 502 as the saved program 170.

If an interruption of the signal transmission of the scheduled program content 502 occurs at the content provider 195 between the times represented by the points 530 and 535, and the content provider 195 is still capable of transmitting content, then the content provider 195 transmits the interruption content 599 via a signal transmission instead of the second part 510. Thus, the second part 510 is completely missing from the signal transmission between the times represented by the points 530 and 535 and is replaced by the interruption content 599 between the times of the points 530 and 535. The second part 510 is thus lost content from the perspective of the of the saved program 170. But, in various embodiments, any portion of the scheduled program content 502 that is missing from the saved program 170 may be lost content, such as the first part 505 or the third party 515.

The program manager 598 includes instructions capable of executing on the processor 555 or statements capable of being interpreted by instructions that execute on the processor 555, to carry out the functions as further described below with reference to FIG. 11.

Figure 6:
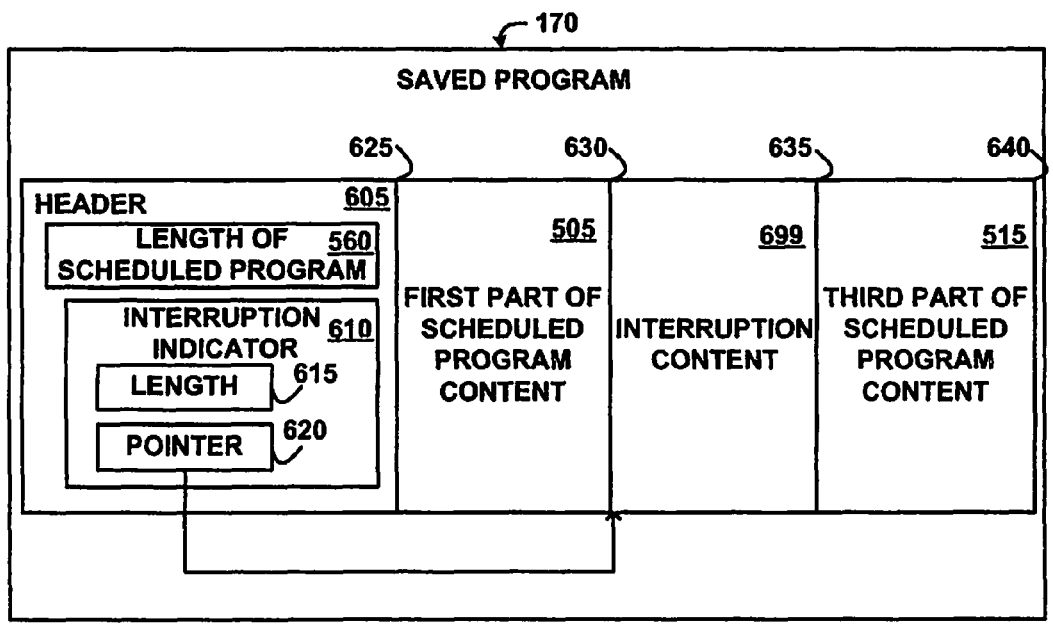
FIG. 6 depicts a block diagram of an example saved program, according to an embodiment of the invention.

FIG. 6 depicts a block diagram of an example saved program 170, according to an embodiment of the invention. The saved program 170 is the content that the controller 176 receives and saves between the scheduled start time 420 and the scheduled stop time 425 from the channel 430, in response to the command represented by a record in the schedule data 174.

The saved program 170 includes a header 605, a first part 505, interruption content 699, and a third part 515. The first part 505 represents the first part of the content of the saved program 170 in time order, the interruption content 699 represents the second part of the content of the saved program 170 in time order, and the third part 515 represents the third part of the content of the saved program 170 in time order, as the saved program 170 was received and recorded in chronological order. The first part 505 is delineated by the points 625 and 630. The interruption content 699 is delineated by the points 630 and 635. The third part 515 is delineated by the points 635 and 640. The point 625 represents the location within the saved program 170 and the time that the first part 505 was initially received, which is the same as the scheduled start time 420. The point 630 represents the end location and received time of the first part 505 and the start location and time of the interruption content 699. The point 635 represents the end location and time of the interruption content 699 and the start location and time of the third part 515. The point 640 represents the end location and time of the third part 515 and of the entire saved program 170, which corresponds to the scheduled stop time 425. The first part 505, the interruption content 699, the third part 515 and the points 625, 630, 635, and 640 are used for convenience of exposition purposes only. The first part 505 in the saved program 170 is the first part 505 in the scheduled program content 502. The third part 515 in the saved program 170 is the third part 515 in the scheduled program content 502. But, the second part 510 (the lost content) in the scheduled program content 502 is missing from the saved program 170 and is replaced by the interruption content 699. That is, the saved program 170 lacks a portion (the lost content) of the scheduled program content 502.

The interruption content 699 represents video, audio, text, images, or any portion, combination, or multiple thereof that the controller 176 recorded to the saved program 170 instead of the second part 510 (the lost content) of the scheduled program content because of an interruption. The interruption content 699 was not identified in the schedule database 520 prior to the controller 176 receiving the interruption content 699. Examples of interruption content 699 include special reports, emergency broadcasts, severe weather warnings or watches, or "test patterns" that are broadcast while the content provider 195 is experiencing technical difficulties. Other examples include a degraded signal transmission, which the user often experiences as "snow" or static or a complete loss of the signal transmission or power outage, which may be represented in the interruption content 699 as static or blank image.

The interruption content 699 in FIG. 6 is the same as the interruption content 599 in FIG. 5 if an interruption occurred at the content provider 195. But, if instead the interruption occurred because of a signal loss or degradation between the content provider 195 and the controller 176 or because of a technical problem or power outage at the location of the DVR 100 or computer system 200, then the interruption content 599 does not exist or is not transmitted, and the interruption content 699 is different from the second part 510.

The header 605 is not part of the displayable, viewable, or presentable content of the saved program 170, but instead includes the length 560 of the scheduled program content (provided by the content provider), one or more interruption indicators 610, which indicate the location (via the pointer 620) and duration (via the length 615) of interruptions in the scheduled program content 502 as recorded in the saved program 170. For example, the pointer 620 contains the address of, or points to, the point 630, which is the start of the interruption content 699, and the length 615 represents the length or duration in time of the interruption content 699. The controller 176 may perform an addition or other calculation on the pointer 620 and the length 615 to find the point 635. The header 605 may further include the title of the saved program 170 or any other appropriate identifying or control information.

FIG. 7A depicts a block diagram of example interruption keywords 172, according to an embodiment of the invention. The interruption keywords 172 include information that the controller 176 uses, in an embodiment, to detect interruptions in scheduled programs. Example interruption keywords 172 include terms that are commonly used in the interruption content 599, such as the names of reporters, or words related to special reports, weather emergencies, road conditions, or civil disturbances. In various embodiments, the user may select the contents of the interruption keywords 172 via the key-in 149 or the terminal 221, the controller 176 may select the interruption keywords 172, or the controller 176 may receive the interruption keywords from the content provider 195.

In an embodiment, the controller 176 determines whether the content of a received signal transmission from the content provider 195 includes interruption content 599 by checking whether the received content includes one or more words that are included in the interruption keywords 172. If the interruption keywords 172 are not present in the content of the received signal transmission from the content provider 195, then the controller 176 may decide that the received content is not interruption content 599. But, if one or more of the interruption keywords 172 are present in the content of the received signal transmission from the content provider 195, then the controller 176 may decide that the received content is interruption content 599.

FIG. 7B depicts a block diagram of example download lost content request 175. The controller 176 sends the download lost content request 175 to the content provider 195 in response to determining that a portion of the scheduled program 502 was lost or not received by the DVR 100 or computer system 200, so that the saved program 170 is different from the scheduled program 502. In response to receiving the request 175, the content provider sends the lost content that is identified by the request 175 to the controller 176.

The example request 175 includes a subscriber identifier field 750, a program identifier field 755, a begin time field 760, an amount field 765, and a fee authorization field 770. The subscriber identifier field 750 identifies the subscriber, user, or viewer that is associated with the request 175, that has an account with the content provider 195, that provided the fee authorization 770, or that selected the download button 325. The program identifier field 755 identifies the scheduled program 502 that was interrupted and for which content was lost. The begin time field 760 specifies the beginning time of the lost content relative to the beginning of the playable content of the scheduled program 502, as the program is played. Using the examples of FIGS. 5 and 6, The begin time 760 corresponds to the point 530 within the scheduled program content 502 and to the point 630 within the saved program 170. Thus, the begin time 760 specifies the amount of time needed to play the first part 505, in order to reach the lost content. In another embodiment, the begin time 760 specifies the amount of data in the first part 505

The amount field 765 specifies the amount, size, or length of the lost content and may be represented in units of time (the amount of time needed to play the lost content) or units of data, such as the number of bytes necessary to store the lost content. Using the example of FIG. 5, the lost content that corresponds to the interruption content 699 is the second part of the scheduled program content 510 since the second part 510 was not recorded to the saved program 170, and the amount 765 is the amount of time needed to play the second part 510 or the amount of data in the second part 510.

The fee authorization 770 specifies an authorization to charge the subscriber 750 an amount of money for retrieving the lost content, which may take the form of an authorization to charge a credit card, and authorization to send the subscriber a bill, an authorization to add a fee amount to the subscriber's account, an authorization to debit the subscriber's bank account, an authorization to bill the subscriber's telephone number, or any other appropriate method of payment.

Figure 8:
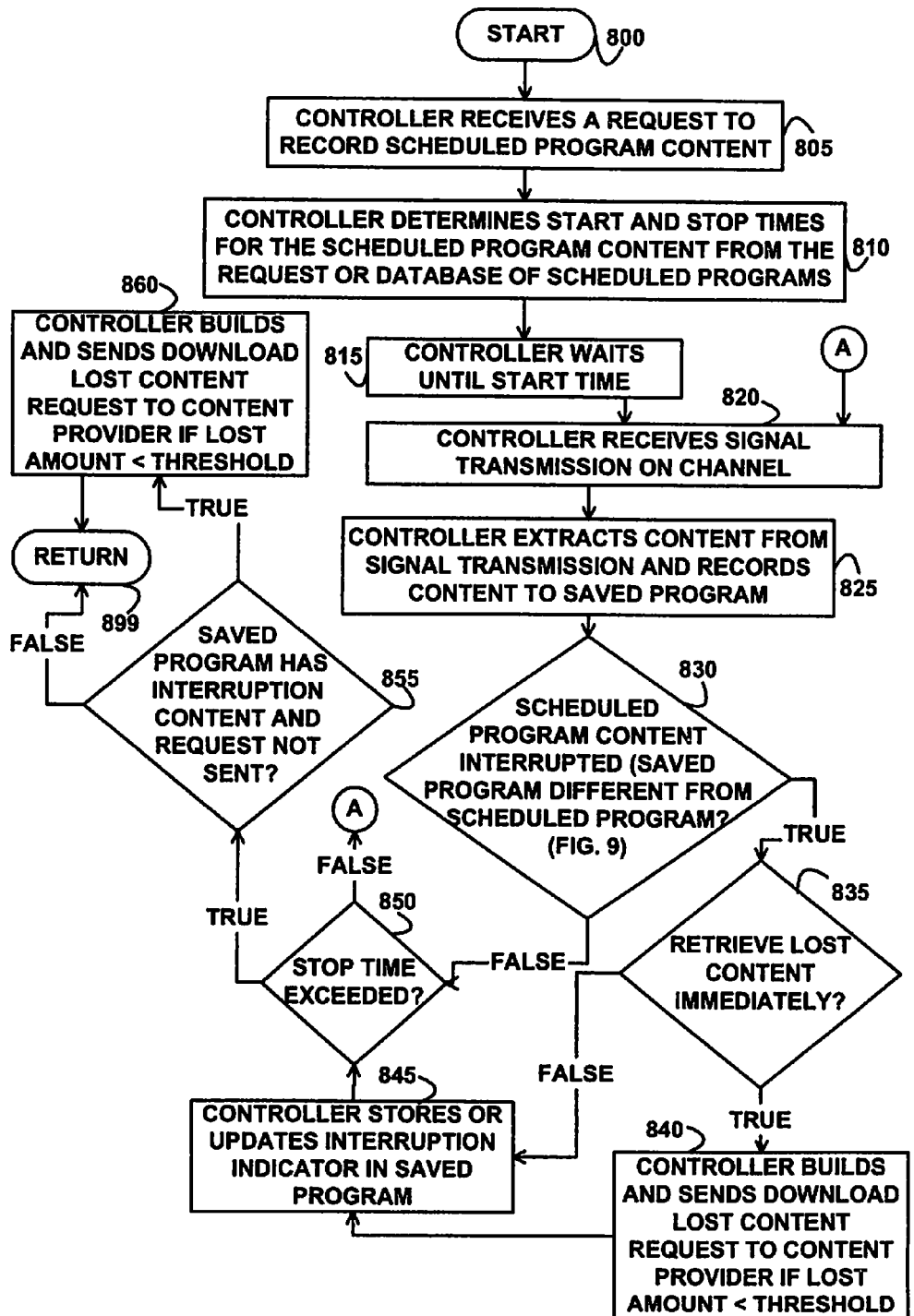
FIG. 8 depicts a flowchart of example processing for recording programs, according to an embodiment of the invention.

FIG. 8 depicts a flowchart of example processing for recording programs, according to an embodiment of the invention. Control begins at block 800. Control then continues to block 805 where the controller 176 receives a request to record scheduled program content 502 via the key-in 194 or the terminal 221. Control then continues to block 810 where the controller 176 determines the scheduled start time 420 and the scheduled stop time 425 for the scheduled program content 502 either as specified by the request or by retrieving the scheduled start time, the scheduled stop time, and/or the channel from the schedule database 520 using a program identifier specified by the request. Control then continues to block 815 where the controller 176 waits until the current time is the same as the scheduled start time 420 of one of the records in the schedule data 174.

Control then continues to block 820 where, at the scheduled start time 420, the controller 176 receives a signal transmission on the channel 430 from the content provider 195 via the AV input 142, the TV tuner 144, or the network 230. If the signal transmission from the content provider 195 does not exist, then the signal that the controller 176 receives may be noise or static. In various embodiments, at block 820, the controller receives the signal transmission for a period of time or for an amount of data embodied in the signal transmission, such as a packet (number of packets) of data, a frame (or number of frames) of data, a line (or number of lines) of data, or any other appropriate amount of time or data.

Control then continues to block 825 where the controller 176 extracts content from the received signal transmission and records the extracted content to the saved program 170. The extracted content may be the parts 505, 510, or 515 of the scheduled program content or the interruption content 699. In an embodiment, the interruption content 699 is the same as the interruption content 599. In another embodiment, the interruption content 699 may be different from the interruption content 599 and may be noise, static, or blank data if the content received on the channel is a degraded signal or no signal.

Control then continues to block 830 where the controller 176 determines whether the transmission of the scheduled program content 502 has been interrupted, so that the saved program includes interruption content and lacks lost content of the scheduled program. That is, the controller 176 determines whether a portion of the saved program content is different from the corresponding portion the scheduled program content, as further described below with reference to FIG. 9.

If the determination at block 830 is true, then the scheduled program content 502 has been interrupted and the saved program (or portion thereof) is different from the scheduled program 502 and lacks the lost content, so control continues to block 835 where the controller 176 determines whether to retrieve or download the lost content at this time, which is prior to the scheduled stop time of the transmission of the scheduled program. In an embodiment, a user indicates a preference (via the key-in 149 or the terminal 221) whether or not lost content for this program in particular, a category to which this program belongs, or all programs are allowed to be retrieved in response to detection of an interruption. In an embodiment, the controller 176 further decides whether to retrieve lost content based on the type of interruption. The type of interruption is determined, as further described below with reference to FIG. 9. For example, if the interruption is a lost or degraded signal transmission, the controller may compare the length or amount (in units of time or quantity of data) of the lost or degraded signal transmission to a low threshold amount and choose to retrieve the lost content immediately if the length or amount of the lost content is greater than the low threshold amount, but choose to not retrieve the lost content immediately if the amount is less than the low threshold amount, in order to avoid retrieving lost content that is so small as to not impact the viewer's satisfaction and also to avoid retrieving many small lost content amounts in succession.

If the determination at block 835 is true, then the immediate retrieval or downloading of the lost content is allowed, so control continues to block 840 where the controller 176 determines whether the amount of the lost content is less than a high threshold amount. In an embodiment, the content provider 195 allows free retrievals of lost content that have a size or amount that is less than the high threshold, but does not allow free retrievals of lost content that have amounts that are greater than or equal to the high threshold, but instead a fee is required. In another embodiment, the high threshold is not used.

If the amount of the lost content is less than the high threshold amount, or the amount of the lost content is greater than the high threshold amount but the user has authorized a fee to be paid to the content provider, or if the high threshold is not used, the controller builds the download lost content request 175. The controller 176 sets the subscriber identifier field 750 in the request 175 to indicate the subscriber or account that is associated with the DVR 100 or the computer system 200. The controller 176 sets the program identifier field 755 to specify the scheduled program 502 whose signal transmission was interrupted. The controller 176 sets the begin time 760 to be the beginning time of the lost content relative to the beginning of the scheduled program content (at the point 530) that corresponds to the beginning time of the interruption content 699 (at the point 630) relative to the start 625 of the playable contents of the saved program 170.

The controller sets the amount 765 to be the size or amount of the lost content, which is the size or amount of data (in units of bytes or in units of playable time), which in the example of FIG. 5 is the amount of playable time of the second part 510. If the interruption occurred because the received signal transmission was lost or degraded or if the received content is different from the scheduled program content (as further described below with reference to FIG. 9), the controller 176 calculates the amount 765 to be amount, size, or length of the interruption content 699. If the interruption occurred because a power outage occurred, the controller 176 calculates the amount 765 to be the time duration of the power loss (the time at which the power returned minus the time at which the power was lost) that occurred between the scheduled start time 420 and the scheduled stop time 425 of the scheduled program. If the interruption occurred because the current time exceeded the scheduled stop time and the saved program lacks a part of the scheduled program content, the controller 187 calculates the amount 765 by subtracting the length of the saved program 170 (in units of time or amount of data) from the length 560 of the scheduled program content that was provided by the content provider in the header 605.

The controller sets the fee authorization field 770 for payment of a fee if authorized by the user. The controller 176 then sends the lost content request 175 to the content provider.

Control then continues to block 845 where the controller 176 stores the interruption indicator 610 in the saved program 170, including the length 615 of the interruption content 699 and the pointer 620 to the start of the interruption content 699, or updates the length 615 if the interruption indicator 610 already exists for the current interruption.

Control then continues to block 850 where the controller 176 determines whether the current time exceeds the scheduled stop time 425. If the determination at block 850 is true, then the current time exceeds the scheduled stop time 425, so control continues to block 855 where the controller 176 determines whether the saved program 170 includes interruption content 699 and the request 175 was not sent (by the processing of block 840).

If the determination at block 855 is true, then the saved program 170 includes interruption content 699 and the request 175 was not previously sent, so control continues to block 860 where the controller 176 determines whether the amount of the lost content is less than a high threshold amount. In an embodiment, the content provider 195 allows free retrievals of lost content that have a size or amount that is less than the high threshold, but does not allow free retrievals of lost content that have amounts that are greater than or equal to the high threshold, but instead a fee is required. In another embodiment, the high threshold is not used.

If the amount of the lost content is less than the high threshold amount, the fee is authorized by the user, or the high threshold is not used, the controller 176 builds the download lost content request 175. The controller 176 sets the subscriber identifier field 750 in the request 175 to indicate the subscriber or account that is associated with the DVR 100 or the computer system 200. The controller 176 sets the program identifier field 755 to specify the scheduled program whose signal transmission was interrupted. The controller 176 sets the begin time 760 to be the beginning time of the lost content relative to the beginning of the scheduled program content (at the point 530) that corresponds to the beginning time of the interruption content 699 (at the point 630) relative to the start 625 of the saved program.

The controller 176 sets the amount 765 to be the size or amount of the lost content, which is the size or amount of data (in units of bytes or in units of time), which in the example of FIG. 5 is the amount of the second part 510. If the interruption occurred because the received signal transmission was lost or degraded or if the received content is different from the scheduled program content (as further described below with reference to FIG. 9), the controller 176 calculates the amount 765 to be amount, size, or length of the interruption content 699. If the interruption occurred because a power outage occurred, the controller 176 calculates the amount 765 to be the time duration of the power loss (the time the power returned minus the time that the power was lost) that occurred between the scheduled start time 420 and the scheduled stop time 425 of the scheduled program. If the interruption occurred because the current time exceeded the scheduled stop time and the saved program lacks a part of the scheduled program content, then the controller 176 calculates the amount 765 by subtracting the length of the saved program 170 from the length 560 in the header 605.

The controller 176 sets the fee authorization field 770 for payment of a fee if authorized by the user. The controller 176 then sends the lost content request 175 to the content provider 195. Control the continues to block 899 where the logic of FIG. 8 returns.

If the determination at block 855 is false, then the saved program does not include interruption content 699 and no content of the scheduled program 502 was lost, or the request 179 was already sent for any lost content (by the action of the processing at block 840), so control continues to block 899 where the logic of FIG. 8 returns.

If the determination at block 850 is false, then the current time does not exceed the scheduled stop time 425 for the scheduled program 502, so control returns to block 820 where the controller 176 receives the next signal transmission on the channel from the content provider 195 if the next signal transmission exists, as previously described above.

If the determination at block 835 is false, then the controller 176 has decided not to retrieve the lost content at this time, so control continues to block 845, as previously described above.

If the determination at block 830 is false, then the scheduled program content 502 has not been interrupted, so control continues to block 850 where the controller 176 determines whether the current time exceeds the scheduled stop time 425 of the scheduled program, as previously described above.

Figure 9:
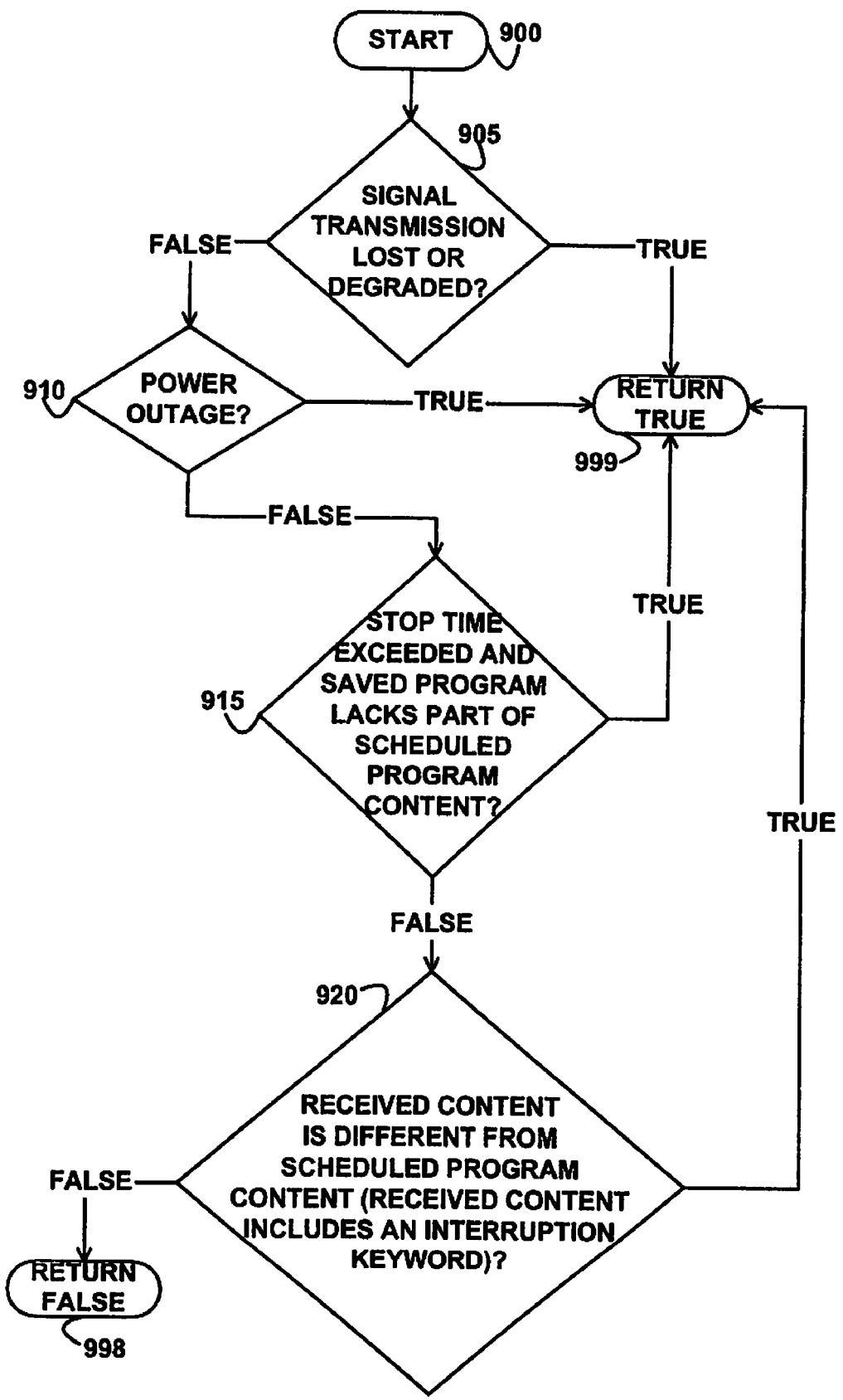
FIG. 9 depicts a flowchart of example processing for determining if scheduled program content was interrupted, according to an embodiment of the invention.

FIG. 9 depicts a flowchart of example processing for determining if scheduled program content was interrupted, according to an embodiment of the invention. Control begins at block 900. Control then continues to block 905 where the controller 176 determines whether the signal transmission from the content provider 195 has been lost or degraded. In an embodiment, the controller 176 determines whether the signal transmission has been degraded by compressing the content of the signal transmission and comparing the effectiveness of the compression of the current signal transmission to previous signal transmissions. If the compression of the current signal transmission is less effective by more than a threshold amount than previous signal transmissions, then the signal transmission has been degraded. If the compression of the current signal transmission is not less effective by more than the threshold amount, then the signal transmission has not been degraded.

If the determination at block 905 is true, then the signal transmission has been lost or degraded, so control continues to block 999 where the logic of FIG. 9 returns a value (e.g., a value of true) that indicates that the scheduled program content 502 has been interrupted to the logic of FIG. 8.

If the determination at block 905 is false, then the signal transmission has not been lost or degraded, so control continues to block 910 where the controller 176 determines whether a power outage has occurred between the scheduled start time 420 and the scheduled stop time 425. In an embodiment, the controller 176 makes the determination of block 910 by comparing the current time to the scheduled start time 420 and the scheduled stop time 425 and determining whether the DVR 100 or the computer system 200 was powered on between the scheduled start time 420 and the scheduled stop time 425 after an abnormal termination or power down of the DVR 100 or the computer system 200.

If the determination of block 910 is true, then a power outage has occurred between the scheduled start time 420 and the scheduled stop time 425 of the scheduled transmission of the scheduled program content 502, so control continues to block 999 where the logic of FIG. 9 returns a value (e.g., a value of true) that indicates that the scheduled program content 502 has been interrupted to the logic of FIG. 8.

If the determination at block 910 is false, then a power outage has not occurred between the scheduled start time 420 and the scheduled stop time 425 of the scheduled transmission of the scheduled program content 502, so control continues to block 915 where the controller 176 determines whether the current time is after the scheduled stop time 425 and the saved program 170 lacks a portion of the scheduled program content 502. In an embodiment, the controller 176 makes the determination of block 915 by comparing the length of the saved program 170 with the length of the scheduled program content 560 in the header 605. In an embodiment, the length of the saved program 170 represents the amount of time that would be taken if the contents of the saved program 170 (the first part 505, the interruption content 699 if it exists, and the third part 599) were played or the amount of data present in the contents of the saved program 170. The length 560 in the header 605 represents the amount of time that would be taken if the contents of the scheduled program content (the parts 505, 510, and 515) were played or represents the amount of data in the parts 505, 510, and 515.

If the determination at block 915 is true, then the current time is after the scheduled stop time 425 and the saved program 170 lacks a portion of the scheduled program content 502 (is missing the lost content), so control continues to block 999 where the logic of FIG. 9 returns a value (e.g., a value of true) that indicates that the scheduled program content 502 has been interrupted to the logic of FIG. 8.

If the determination at block 915 is false, then the current time is not after the scheduled stop time 425 or the saved program 170 contains all of the scheduled program content 502, so control continues to block 920 where the controller 176 determines whether the received content is different from the scheduled program content 502 because the received content includes an interruption keyword 172. The controller 176 makes the determination of block 920 by comparing the interruption keywords 172 to the content of the received signal transmission and determining whether one or more of the interruption keywords 172 are the same as words in the content of the received signal transmission. In various embodiments, the controller 176 may compare the interruption keywords 172 to closed caption data in the signal transmission or use a speech-to-text application to convert audio of the content of the signal transmission to text for comparison against the interruption keywords 172.

If the determination at block 920 is true, then the received content is different from the scheduled program content 502 because the received content includes an interruption keyword, so control continues to block 999 where the logic of FIG. 9 returns a value (e.g., a value of true) that indicates that the scheduled program content 502 has been interrupted to the logic of FIG. 8.

If the determination at block 920 is false, then the received content is not different from the scheduled program content 502 and the received content does not include an interruption keyword, so control continues to block 998 where the logic of FIG. 9 returns a value (e.g., a value of false) that indicates that the scheduled program content 502 has not been interrupted to the logic of FIG. 8.

Figure 10:
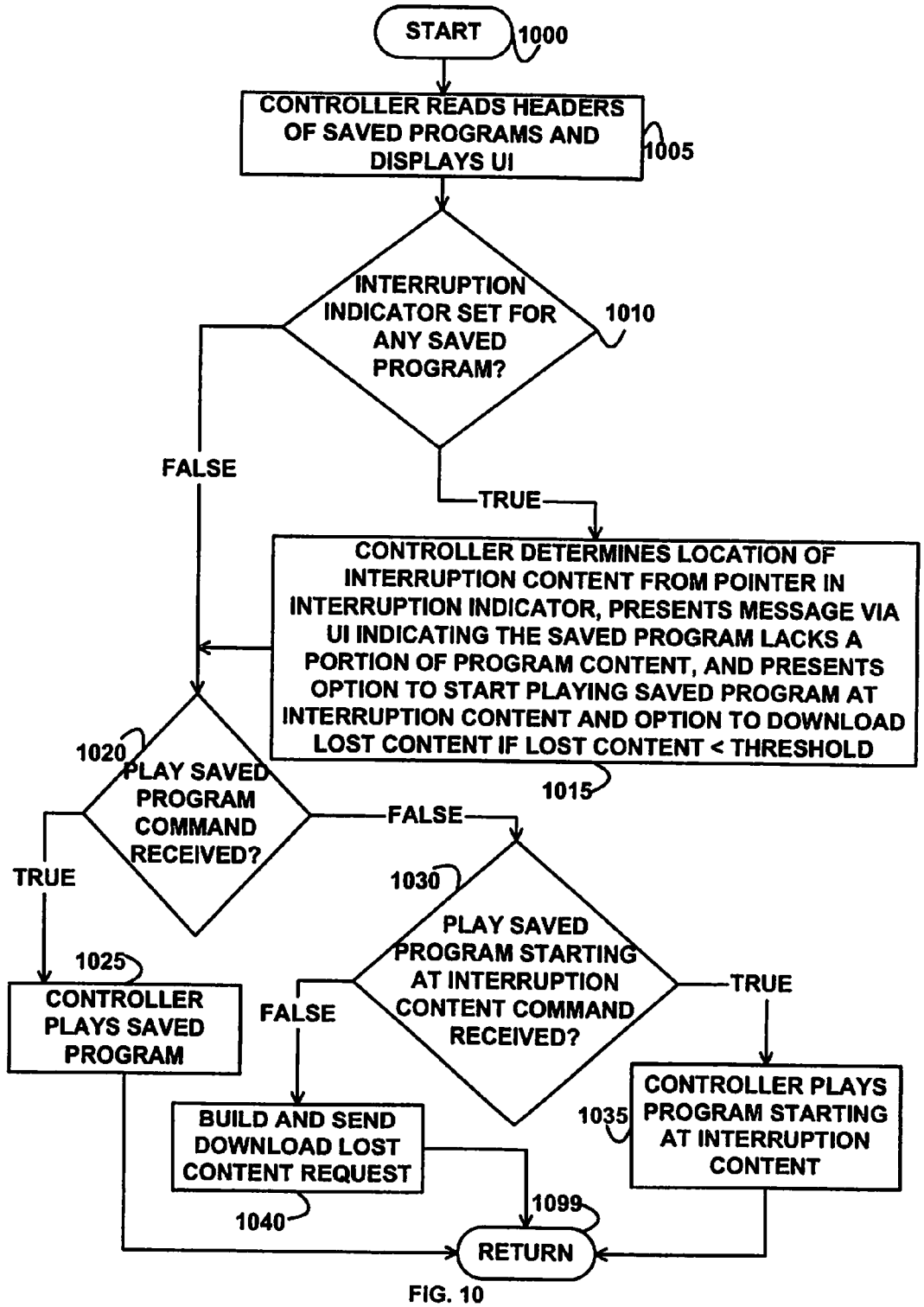
FIG. 10 depicts a flowchart of example processing for handling a prerecorded program, according to an embodiment of the invention.

FIG. 10 depicts a flowchart of example processing for handling a prerecorded saved program, according to an embodiment of the invention. Control begins at block 1000. Control then continues to block 1005 where the controller 176 reads the headers 605 of the saved programs 170 and displays the titles 302, 304, and 306, and the play button 310 via the user interface 300. Control then continues to block 1010 where the controller 176 determines whether an interruption indicator 610 is present for any saved program 170.

If the determination at block 1010 is true, then an interruption indicator 610 is present for at least one saved program 170, so control continues to block 1015 where the controller 176 determines the location of the interruption content 699 from the pointer 620 in the interruption indicator 610, presents the message 320 via the user interface 300, indicating that the saved program 170 lacks a portion of the scheduled program content 502, presents an option 315 to start playing the saved program 170 at the interruption content 699 or a time period before the interruption content 699, and presents an option or button 325 to download or retrieve and record the content that was lost (replacing the interruption content) because of the interruption.

Control then continues to block 1020 where the controller 176 determines whether the play saved program command has been received, e.g., via selection of the button 310. If the determination at block 1020 is true, then a play saved program command has been received, so control continues to block 1025 where the controller 176 plays or presents the saved program 170 via the monitor 199 or the terminal 221. Control then continues to block 1099 where the logic of FIG. 10 returns.

If the determination at block 1020 is false, then a play saved program command has not been received, so control continues to block 1030 where the controller 176 determines whether a play option 315 has been received that requests starting play at the interruption content 699 or at a location that is a time period prior to the interruption content 699. If the determination at block 1030 is true, then the play option 315 has been received, so control continues to block 1035 where the controller 176 plays or presents the saved program 170 starting at the location of the point 630 of the start of the interruption content 699 or starting a time period prior to the interruption content 699. In an embodiment, the controller 176 starts playing or presenting the saved program 170 at a location that is a specified period of playing time before the point 630 of the start of the interruption content 699. In another embodiment, the controller 176 optionally starts playing the saved program 170 at the point 635 at the end of the interruption content 699. In this way, the user may view, hear, or receive the context of the interruption content 699. Control then continues to block 1099 where the logic of FIG. 10 returns.

If the determination at block 1030 is false, then the download command 325 was received, so control continues to block 1040 where the controller 176 determines whether the amount of the lost content is less than a high threshold amount. In an embodiment, the content provider 195 allows free retrievals of lost content that have a size or amount that is less than the high threshold, but does not allow free retrievals of lost content that have amounts that are greater than or equal to the high threshold unless a fee is required. In another embodiment, the high threshold is not used.

If the amount of the lost content is less than the high threshold amount, the high threshold is not used, or the fee is authorized by the user, the controller 176 builds the download lost content request 175. The controller 176 sets the subscriber identifier field 750 in the request 175 to indicate the subscriber or account that is associated with the DVR 100 or the computer system 200. The controller 176 sets the program identifier field 755 to specify the scheduled program whose signal transmission was interrupted. The controller 176 sets the begin time 760 to be the beginning time of the lost content relative to the beginning of the scheduled program content (at the point 530) that corresponds to the beginning time of the interruption content 699 (at the point 630) relative to the start 625 of the saved program.

The controller 176 sets the amount 765 to be the size or amount of the lost content, which is the size or amount of data (in units of bytes or in units of time), which in the example of FIG. 5 is the amount of the second part 510. If the interruption occurred because the received signal transmission was lost or degraded or if the received content is different from the scheduled program content (as previously described above with reference to FIG. 9), the controller 176 calculates the amount 765 to be amount, size, or length of the interruption content 699. If the interruption occurred because a power outage occurred, the controller 176 calculates the amount 765 to be the time duration of the power loss (the time the power returned minus the time that the power was lost) that occurred between the scheduled start time 420 and the scheduled stop time 425 of the scheduled program. If the interruption occurred because the current time exceeded the scheduled stop time and the saved program lacks a part of the scheduled program content, the controller 176 calculates the amount 765 by subtracting the length of the saved program 170 with the length in the header 503 of the scheduled program content 502.

The controller 176 sets the fee authorization field 770 for payment of a fee if authorized by the user. The controller 176 then sends the lost content request 175 to the content provider. Control then continues to block 1099 where the logic of FIG. 10 returns.

If the determination at block 1010 is false, then an interruption indicator 610 is not present for any saved program 170, so control continues to block 1020, as previously described above.

Figure 11:
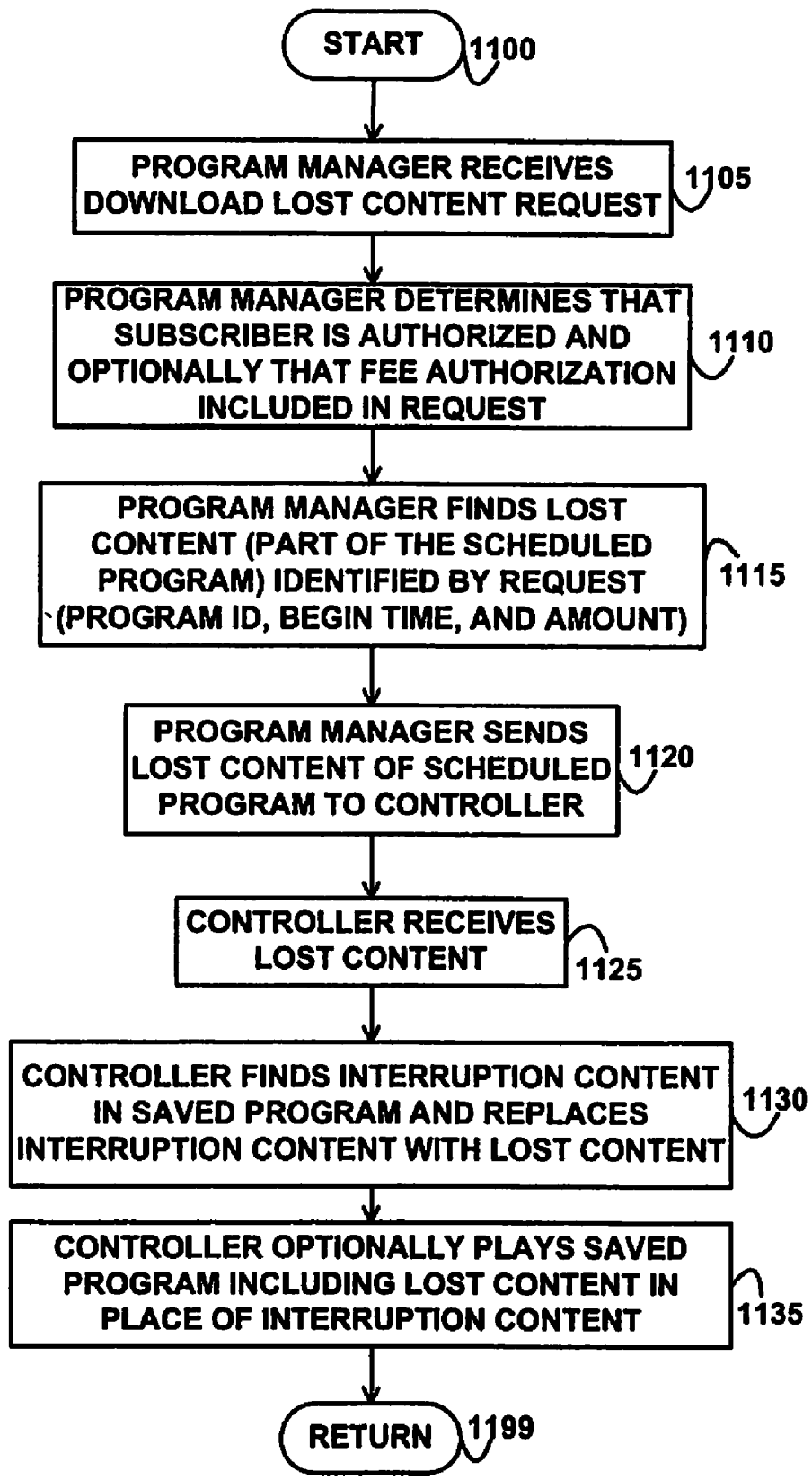
FIG. 11 depicts a flowchart of example processing for a download lost content request, according to an embodiment of the invention.

FIG. 11 depicts a flowchart of example processing for a download lost content request, according to an embodiment of the invention. Control begins at block 1100. Control then continues to block 1105 where the program manager 598 receives the download lost content request 175. Control then continues to block 1110 where the program manager 598 determines that the subscriber 750 is authorized to retrieve lost content and optionally determines that the proper fee authorization is included in the request and optionally determines if the amount 765 of lost content requested by the request 175 meets the policies for free retrieval (e.g., the amount 765 is less than the high threshold amount if the fee authorization is not provided).

Control then continues to block 1115 where the program manager 598 finds the lost content in the scheduled program that is identified by the program identifier 755 that starts at the begin time 760 (relative to the beginning of the scheduled program) and that is identified by the amount 765. In an embodiment, the program manager 598 finds the second part 510 that has a begin time at the point 530 relative to the beginning 525 of the scheduled program content 502 that is specified by the begin time 760 and the amount 765. The program manager 598 further determines that the amount 765 of the lost content (the second part 510) is the amount represented by the duration of the second part 510 between the points 530 and 530.

Control then continues to block 1120 where the program manager 598 sends the lost content (the second part 510) that starts at the begin time 760 from the start of the program 755 and has an amount 765 to the controller 176, in response to the request 175.

Control then continues to block 1125 where the controller 176 receives the lost content from the content provider 195. Control then continues to block 1130 where the controller 176 finds the interruption content 699 in the saved program for which the controller requested the lost content and replaces the interruption content 699 with the received lost content.

If the interruption content 699 is not large enough to hold the lost content, e.g., if the interruption occurred because of a power loss at the DVR 100 or the computer system 200, then the controller 176 may make room for the lost content by moving the third part 515. In another embodiment, the controller 176 stores the lost content at a different location and adds a pointer to the saved program at the location of the interruption content 699 that points at the location of beginning the lost content. The controller 176 further adds a pointer after the end of the lost content that points at the beginning of the third part 515 (the point 635).

Control then continues to block 1135 where the controller 176 optionally plays the saved program, including the lost content that is now in place of the interruption content 699 or at another location but pointed to by the saved program. Control then continues to block 1199 where the logic of FIG. 11 returns.

In the previous detailed description of exemplary embodiments of the invention, reference was made to the accompanying drawing (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized, and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
  receiving content on a channel between a scheduled start time and a scheduled stop time, wherein a schedule specifies a planned transmission of a scheduled program between the scheduled start time and the scheduled stop time on the channel;
  recording the content to a saved program;
  determining that the content of the saved program comprises interruption content that is different from lost content, wherein the scheduled program comprises the lost content;
  calculating a begin time of the lost content relative to a beginning of the scheduled program;
  calculating the amount of the lost content, wherein the calculating the amount of the lost content further comprises calculating an amount of the interruption content, wherein the interruption content was received via a degraded signal;
  adding the begin time and the amount of the lost content to the request;
  sending a request for the lost content to a content provider if an amount of the lost content is greater than a first threshold amount and less than a second threshold amount;
  sending the request for the lost content to the content provider if the amount of the lost content is greater than the second threshold amount and the request comprises a fee authorization;
  refraining from the sending the request for the lost content to the content provider if the amount of the lost content, which is greater than zero, is not greater than the first threshold amount;
  receiving the lost content from the content provider; and
  replacing the interruption content in the saved program with the lost content.

2. The method of claim 1, wherein the sending the request further comprises:
  sending the request at a time that is between the scheduled start time and the scheduled stop time.

3. The method of claim 1, wherein the sending the request further comprises:
  sending the request after the scheduled stop time.

4. A non-transitory storage medium encoded with instructions, wherein the instructions when executed comprise:
  receiving content on a channel between a scheduled start time and a scheduled stop time, wherein a schedule specifies a planned transmission of a scheduled program between the scheduled start time and the scheduled stop time on the channel;
  recording the content to a saved program;
  determining that the content of the saved program comprises interruption content that is different from lost content, wherein the scheduled program comprises the lost content;
  calculating a begin time of the lost content relative to a beginning of the scheduled program;
  calculating the amount of the lost content, wherein the calculating the amount of the lost content further comprises calculating a time duration of a power outage that occurred between the scheduled start time and the scheduled stop time of the scheduled program;
  adding the begin time and the amount of the lost content to the request;

sending a request for the lost content to a content provider if an amount of the lost content is greater than a first threshold amount and less than a second threshold amount;

sending the request for the lost content to the content provider if the amount of the lost content is greater than the second threshold amount and the request comprises a fee authorization;

refraining from the sending the request for the lost content to the content provider if the amount of the lost content, which is greater than zero, is not greater than the first threshold amount;

receiving the lost content from the content provider; and replacing the interruption content in the saved program with the lost content.

5. The non-transitory storage medium of claim 4, wherein the sending the request further comprises:

sending the request at a time that is between the scheduled start time and the scheduled stop time.

6. The non-transitory storage medium of claim 4, wherein the sending the request further comprises:

sending the request after the scheduled stop time.

7. A digital video recorder comprising:

a processor; and a storage medium connected to the processor, wherein the storage medium is encoded with instructions, and wherein the instructions when executed on the processor comprise:

receiving content on a channel between a scheduled start time and a scheduled stop time, wherein a schedule specifies a planned transmission of a scheduled program between the scheduled start time and the scheduled stop time on the channel, recording the content to a saved program, determining that the content of the saved program comprises interruption content that is different from lost content, wherein the scheduled program comprises the lost content, calculating a begin time of the lost content relative to a beginning of the scheduled program, calculating the amount of the lost content, wherein the calculating the amount of the lost content further comprises calculating a time duration of a power outage that occurred at the digital video recorder between the scheduled start time and the scheduled stop time of the scheduled program, adding the begin time and the amount of the lost content to the request, sending a request for the lost content to a content provider if an amount of the lost content is greater than a first threshold amount and less than a second threshold amount, sending the request for the lost content to the content provider if the amount of the lost content is greater than the second threshold amount and the request comprises a fee authorization, refraining from the sending the request for the lost content to the content provider if the amount of the lost content, which is greater than zero, is not greater than the first threshold amount, receiving the lost content from the content provider, and replacing the interruption content in the saved program with the lost content.

8. The digital video recorder of claim 7, wherein the sending the request further comprises:

sending the request at a time that is between the scheduled start time and the scheduled stop time.

\* \* \* \* \*